(12) United States Patent  
Sjunnesson et al.

(10) Patent No.: US 7,905,448 B2  
(45) Date of Patent: Mar. 15, 2011

(54) ANNULAR TORSIONAL RIGID STATIC COMPONENT FOR AN AIRCRAFT ENGINE

(75) Inventors: Anders Sjunnesson, Trollhättan (SE); Henrik Karlsson, Uddevalla (SE); Mathias Andersson, Strömsund (SE)

(73) Assignee: Volvo Aero Corporation, Trollhättan (SE)

( * ) Notice: Subject to any disclaimer, the term of this patent is extended or adjusted under 35 U.S.C. 154(b) by 551 days.

(21) Appl. No.: 11/722,717

(22) PCT Filed: Dec. 19, 2005

(86) PCT No.: PCT/SE2005/001976  
§ 371 (c)(1),  
(2), (4) Date: Mar. 5, 2008

(87) PCT Pub. No.: WO2006/068600  
PCT Pub. Date: Jun. 29, 2006

(65) Prior Publication Data  
US 2009/0114766 A1     May 7, 2009

(30) Foreign Application Priority Data  
Dec. 23, 2004  (SE) ...................................... 0403194

(51) Int. Cl.  
*B64D 27/00* (2006.01)

(52) U.S. Cl. .............. 244/54; 60/796; 60/797; 248/554; 248/557; 415/213.1; 415/126

(58) Field of Classification Search .................... 244/54, 244/53 B; 248/554–557; 60/796, 797; 415/142, 415/213.1, 214.1, 215.1, 126, 134  
See application file for complete search history.

(56) References Cited

U.S. PATENT DOCUMENTS

| | | | |
|---|---|---|---|
| 3,042,349 A * | 7/1962 | Pirtle et al. ..................... 248/554 |
| 4,132,069 A * | 1/1979 | Adamson et al. ............ 60/226.1 |
| 4,859,143 A * | 8/1989 | Larrabee et al. .............. 415/142 |
| 5,160,676 A * | 11/1992 | Singh et al. ................ 156/89.26 |
| 5,174,525 A * | 12/1992 | Schilling ......................... 244/54 |
| 5,275,357 A * | 1/1994 | Seelen et al. .................... 244/54 |
| 5,452,575 A * | 9/1995 | Freid ............................... 60/797 |
| 5,467,941 A | 11/1995 | Chee |
| 5,484,120 A | 1/1996 | Blakeley et al. |
| 5,746,391 A * | 5/1998 | Rodgers et al. ................. 244/54 |
| 5,860,275 A * | 1/1999 | Newton et al. ............... 60/226.1 |
| 6,126,110 A * | 10/2000 | Seaquist et al. ................. 244/54 |
| 6,223,524 B1 * | 5/2001 | Durcan ........................ 60/226.1 |
| 6,401,448 B1 * | 6/2002 | Manteiga et al. ............ 60/226.1 |
| 6,474,596 B1 * | 11/2002 | Cousin et al. ................... 244/54 |
| 6,547,518 B1 * | 4/2003 | Czachor et al. ............... 415/137 |
| 2003/0015623 A1 | 1/2003 | Gladstone et al. |

FOREIGN PATENT DOCUMENTS

WO    2004083605 A1    9/2004

OTHER PUBLICATIONS

International Search Report for corresponding International Application PCT/SE2005/001976.  
International Preliminary Report on Patentability for corresponding International Application PCT/SE2005/001976.

* cited by examiner

*Primary Examiner* — Tien Dinh  
*Assistant Examiner* — Justin Benedik  
(74) *Attorney, Agent, or Firm* — WRB-IP LLP

(57) ABSTRACT

In an annular torsional rigid static component for an aircraft engine, the component includes at least one arrangement for mounting the engine to an aircraft. The mounting arrangement comprises a body formed in a composite material.

18 Claims, 5 Drawing Sheets

ANNULAR TORSIONAL RIGID STATIC COMPONENT FOR AN AIRCRAFT ENGINE

BACKGROUND AND SUMMARY

The present invention relates to an annular torsional rigid static component for an aircraft engine, the component comprises at least one means for mounting the engine to an aircraft.

The aircraft engine is preferably a jet engine. The term jet engine includes various types of engines, which admit air at relatively low velocity, heat it by combustion and shoot it out at a much higher velocity. Accommodated within the term jet engine are, for example, turbojet engines and turbo-fan engines. The invention will below be described for a turbo-fan engine, but may of course also be used for other engine types.

An aircraft engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotatably driven to compress air entering the core engine to a relatively high pressure. This high pressure air is then mixed with fuel in the combustor and ignited to form a high energy gas stream. The gas stream flows aft and passes through the high-pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Most of the thrust produced is generated by the fan. Engine frames are used to support and carry the bearings, which in turn, rotatably support the rotors. Conventional turbo fan engines have a fan frame, a mid-frame and an aft turbine frame.

The structural strength of the aircraft engine hinges upon a limited number of such engine frames or structures, also known as cases or housings. These structures therefore represent the skeleton of the engine. The structures are highly loaded during operation of the engine. The structures usually comprise a bearing house for the engine shafts, a gas flow channel in the form of an annular duct and radial struts which form the link between the inner and outer parts of the engine. Thus the air is forced rearwardly through the openings between adjacent struts.

The engine is mounted to the aircraft wing via a mount system (normally a pylon and associated thrust links) at a forwardly located fan frame forward mount on the fan frame and at a rearwardly located turbine frame aft mount on the turbine frame. The function of these mounting means is to transfer load from the engine to the aircraft. Most often there are two types of mounting means in an engine, a first type that takes lateral and vertical loads and a second type that takes the load in the axial direction (thrust mounts).

It is desirable to achieve an annular static torsional rigid aircraft engine component with mounting means for connection to an aircraft, which creates conditions for a more lightweight engine.

In accordance with an aspect of the present invention, said mounting means comprises a body formed in a composite material. Composites are of lightweight and have a high specific stiffness and strength. Use of composites therefore make the engine's non-rotating, load carrying, structural component lighter while the stiffness and rigidity is substantially maintained.

According to a preferred embodiment, said composite body forms a wall structure. Such a wall structure encasing an internal chamber, one or several voids, or a through-hole creates conditions for a further lighter component in contrast to a solid unit. Further, said mounting means comprises a rigid member fitted tightly around the composite body and that the rigid member comprises a connection element for connection to the aircraft. By virtue of this design the mechanical load is distributed over a large surface in the composite to avoid local stress (compression) concentrations.

According to a further preferred embodiment, the component comprises a rigid annular support member and that the composite body is rigidly secured to said annular support member. By virtue of this design, a high torsional rigidity is achieved.

According to a further development of the last-mentioned embodiment, said rigid support member comprises an outer ring and an inner ring, that said mounting means is arranged between the inner and outer ring and that the composite body is rigidly connected to both rings thereby forming the torsional rigid unit.

Further advantageous embodiments and further advantages of the invention emerge from the detailed description below.

BRIEF DESCRIPTION OF THE DRAWINGS

The invention will be explained below, with reference to the embodiments shown on the appended drawings, wherein.

DETAILED DESCRIPTION

Figure 1:
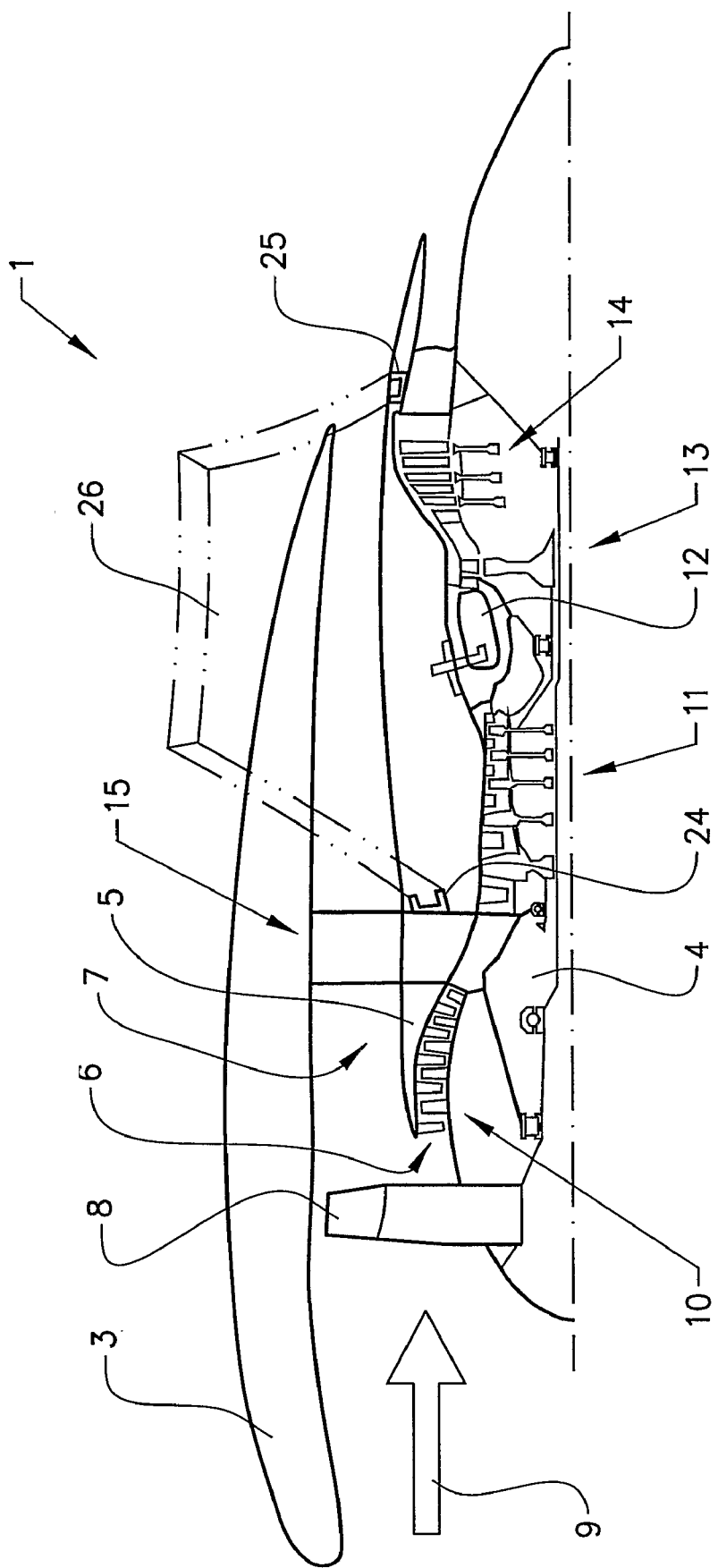
FIG. 1 illustrates an aircraft engine according to prior art in a schematic cut side view.

The invention will below be described for a turbofan gas turbine aircraft engine 1, which in FIG. 1 is circumscribed about an engine longitudinal central axis 2. The engine 1 comprises an outer casing 3, or nacelle, an inner casing 4, and an intermediate casing 5, which is concentric to the first two casings and divides the gap between them into an inner primary gas channel 6, or core duct, for the compression of air and a secondary channel 7 in which the engine bypass air flows. Thus, each of the gas channels 6,7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed co-axially with and radially inwardly of the high pressure rotor.

A load carrying, torsionally rigid engine structure 15, in the following referred to as a static component, is arranged between the low pressure compressor 10 and the high pressure compressor 11 in the axial direction of the engine 1. The load carrying static component is also known as a case, housing or frame. The component 15 is highly loaded during certain periods of a normal operating cycle of the engine.

The engine 1 is mounted to the aircraft (not shown) at a forwardly located fan frame forward mount 24 on the static component 15 and at a rearwardly located turbine frame aft mount 25 on the turbine frame. A mount system 26, normally comprising a pylon extending downwards from an aircraft wing and associated thrust links, is schematically indicated in FIG. 1. The mount system 26 is secured to the forward and aft mounts 24,25.

Figure 2:
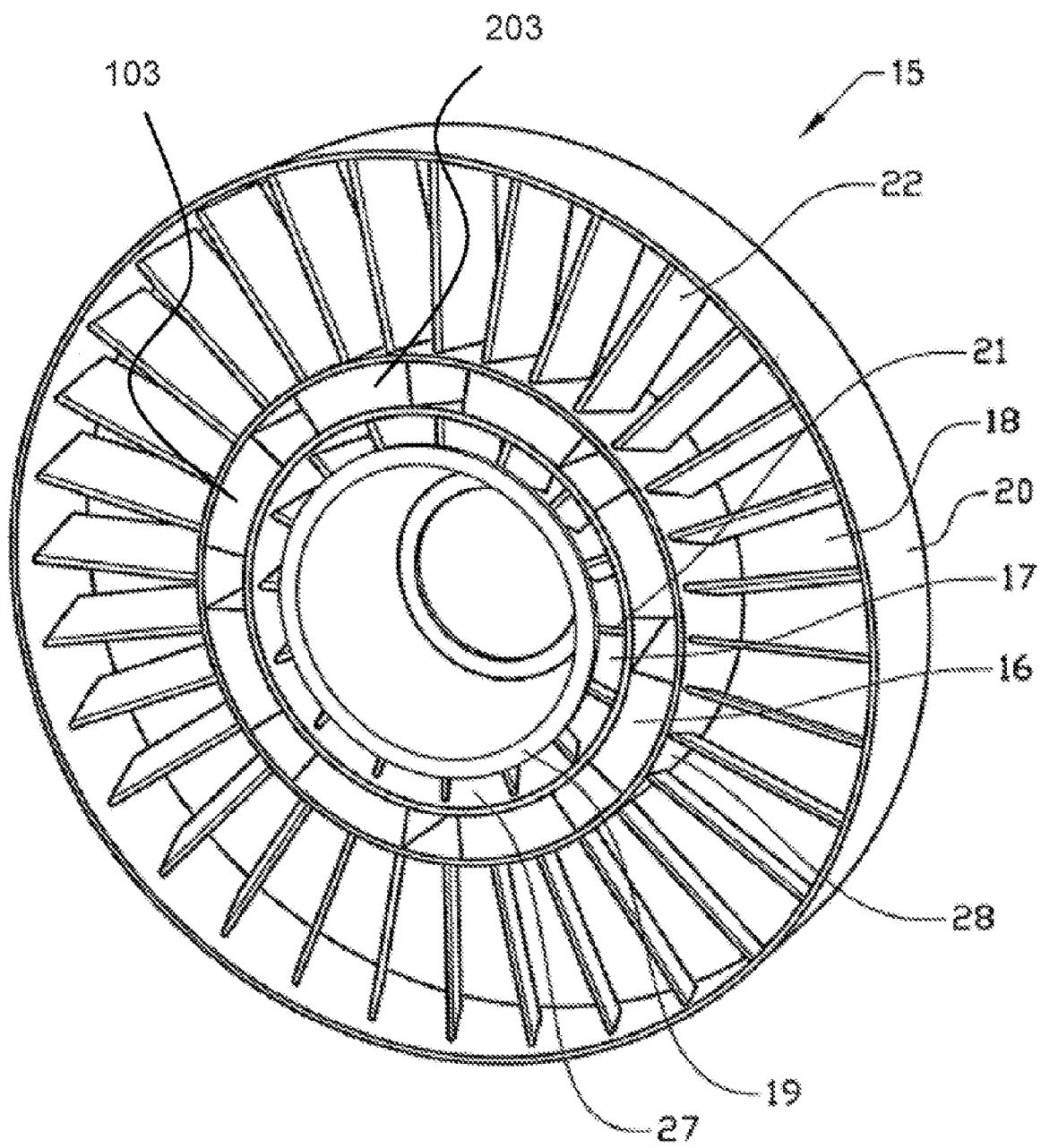
FIG. 2 illustrates a static gas turbine component for the aircraft engine in FIG. 1 in a perspective view, FIG. 3 schematically illustrates the positions of three mounting means in the component according to FIG. 2, FIG. 4-9 illustrate a first embodiment of a thrust mounting means.

FIG. 2 illustrates a perspective view of the load carrying static component 15. The static component 15 comprises an annular intermediate, or splitter, member 16, which defines inner and outer annular passages 17,18. The inner passage 17 forms part of the inner primary gas channel 6 of the aircraft engine and the outer passage 18 forms part of the secondary channel 7 in which the engine bypass air flows.

The annular intermediate member 16 is supported between an inner annular support member 19 and an outer annular support member 20 by a plurality of circumferentially spaced radial inner and outer struts 21,22, or stator vanes. The inner and outer support members 19,20 and the annular intermediate member 16 are coannular.

Opposite ends of the inner struts 21 are rigidly connected to the inner annular member 19 and the intermediate member 16 for transmitting structural loads between said members. Opposite ends of the outer struts 22 are rigidly connected to the intermediate member 16 and the outer annular member 20 for transmitting structural loads between said members. The air is forced rearwardly through openings between adjacent struts 21,22.

The annular intermediate member 16 comprises an outer ring 27 and an inner ring 28 of metal material," which defines the outer passage 18 and the inner passage 17, respectively.

Figure 3:
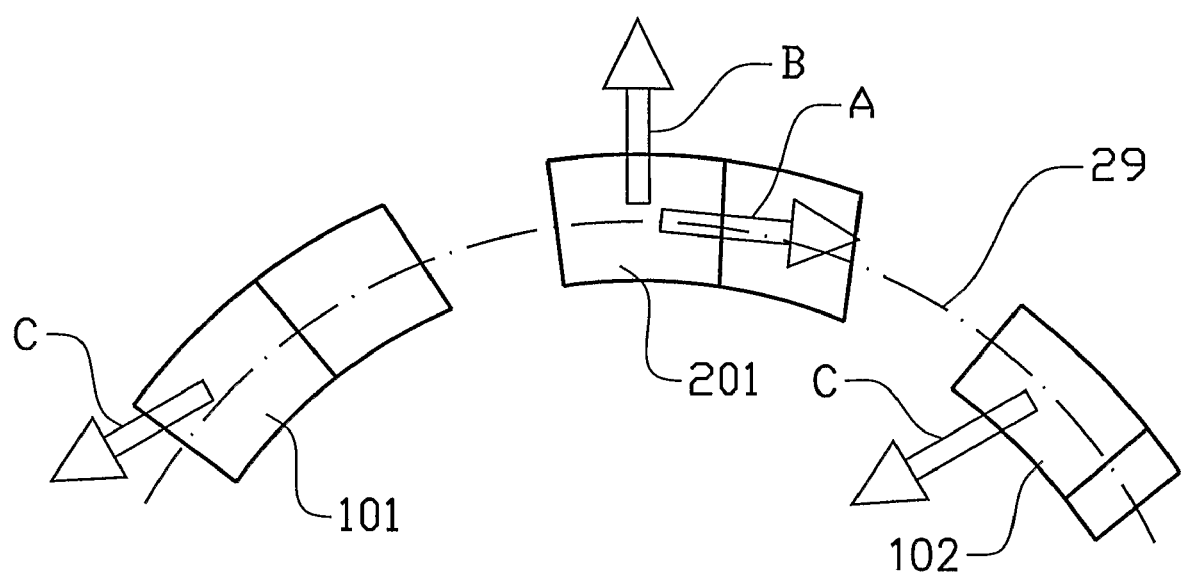
Figure 4:
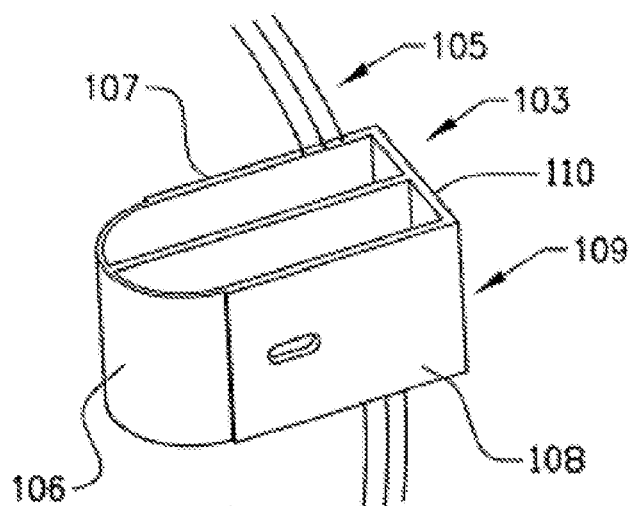

The schematically disclosed and previously known fan frame forward mount 24 in FIG. 1 is replaced by three mounting means 101,102,201. FIG. 3 schematically illustrates these three mounting means 101,102,201. A first mounting means 201 is arranged at an uppermost, central position. The first mounting means 201 is designed for carrying lateral and vertical loads, see arrows A and B, in the engine 1. A second and third mounting means 101,102 are arranged on opposite sides of and distanced from the first mounting means 201 in a circumferential direction 29 of the annular component. The second and third mounting means 101,102 are designed for taking thrust loads in the axial direction, see arrow C, of the engine and are of identical design.

The three mounting means 101,102,201 are designed to be arranged between the inner and outer ring 27,28 in the structure 15. The three mounting means 101,102,201 are rigidly connected to the structure 15.

One embodiment of the thrust mounting means 101 is illustrated in FIG. 4-9. The thrust mounting means 101 comprises a body 103 formed in a composite material. The composite body 103 is rigidly connected to both rings 27,28 forming a torsional rigid unit therewith. The composite body 103 forms a box-shaped wall structure with a force distributing geometry. The walls define the outer boundaries of the body 103. The composite body 103 comprises a polymer matrix 104, see FIG. 9.

A plurality of high strength fibers 105 form an extended structure in the circumferential direction 29 of the annular component 15. More specifically, said plurality of high strength fibers 105 form a continuous annular structure. The fibers 105 run through the matrix material and are embedded in the matrix material 104, forming the composite body 103 of the mounting means 101. The fiber structure is further rigidly secured to the intermediate annular member 19.

The composite wall structure 103 comprises a front wall 106 with a curved shape facing in an axial direction of the annular component 15. The wall structure further comprises two flat opposite, parallel sidewalls 107,108 and a rear wall 109, which together with the front wall form a continuous wall structure defining a central through-hole. An intermediate, central support wall 110 extends between the front and rear wall 106,109 in parallel with the side walls 107,108.

The fiber structure extends through one side wall 107. A parallel fiber structure (not shown) extends through the other side wall 108.

The thrust mounting means 101 comprises a rigid member 111 fitted tightly around the composite body 106. The rigid member 111 comprises a connection element 112, in the form of a female portion, at a rear position of the thrust means 101, for connection to the aircraft. More specifically, the female portion comprises an opening in two spaced flanges 113,114 extending rearwards from the composite body 103. The female portion 112 is designed for receiving a complementary shaped male portion of the thrust link system.

Figure 5:
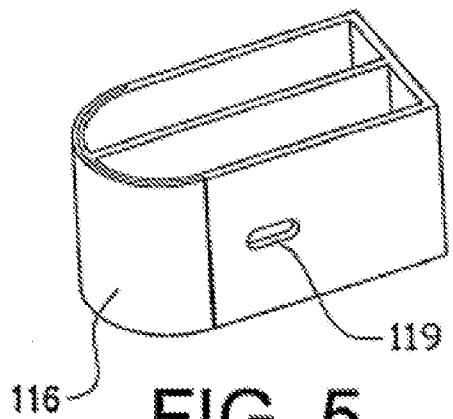
Figure 6:
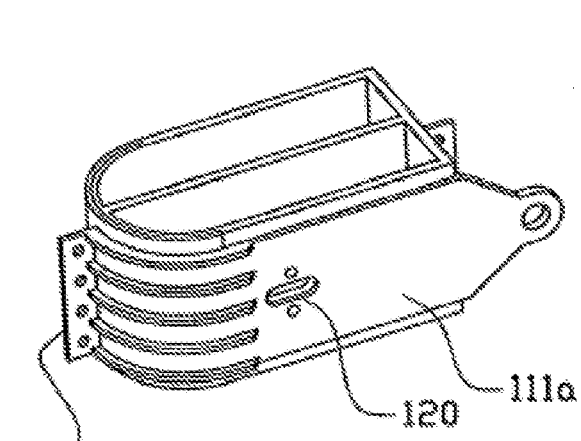
Figure 7:
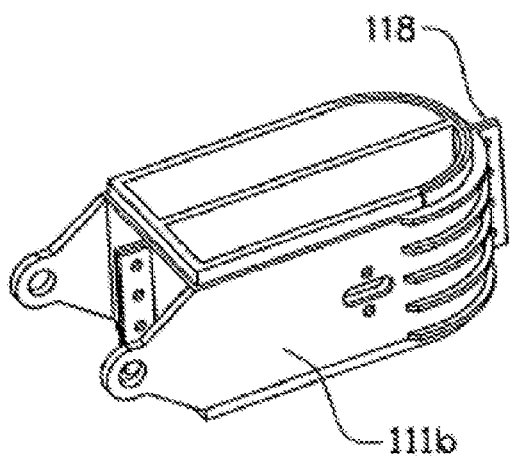
Figure 8:
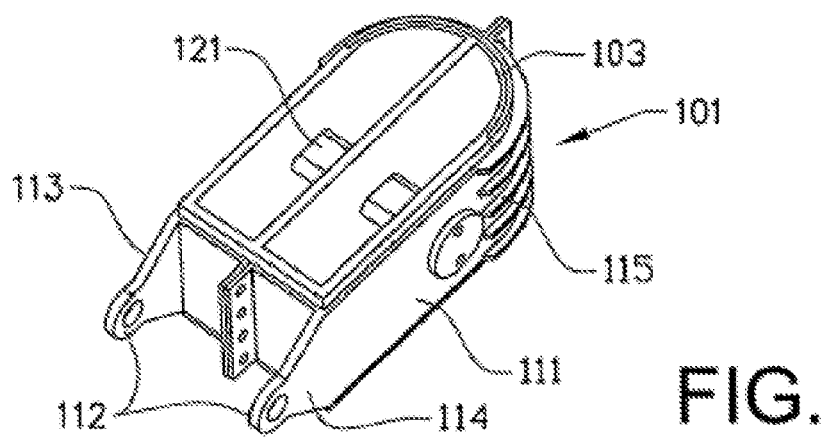
Figure 9:
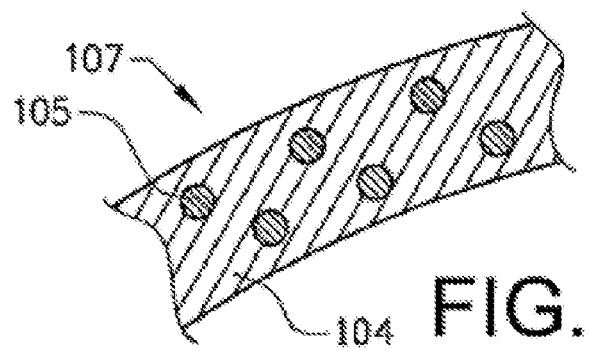
Figure 10:
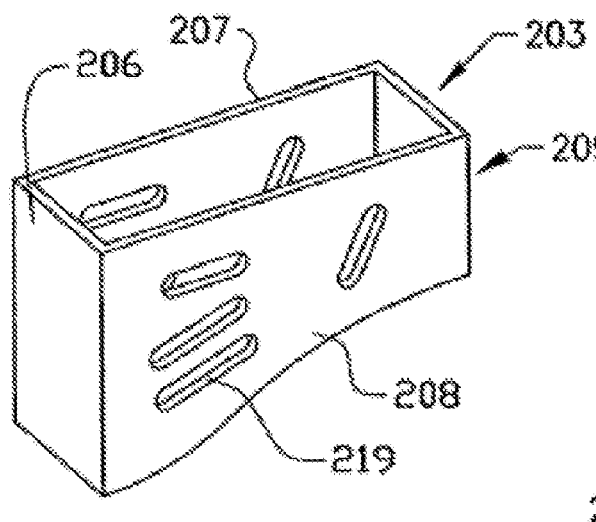
FIG. 10-13 illustrate a first embodiment of a mounting means for lateral and vertical loads.
Figure 11:
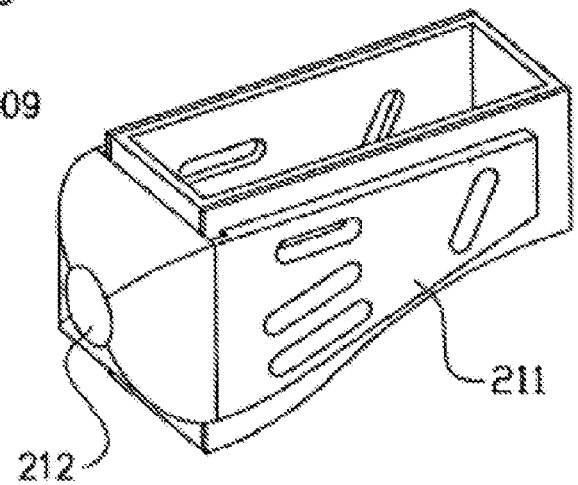
Figure 12:
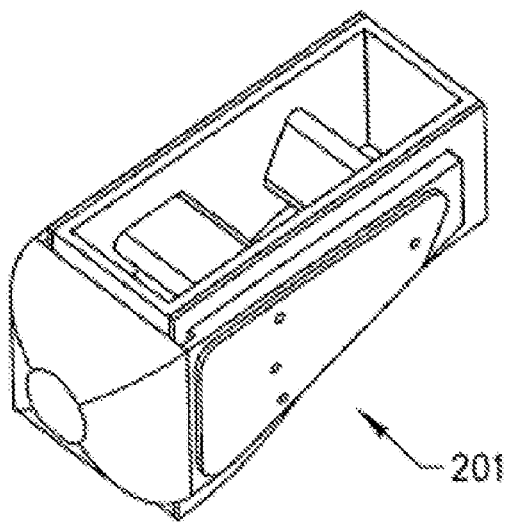
Figure 13:
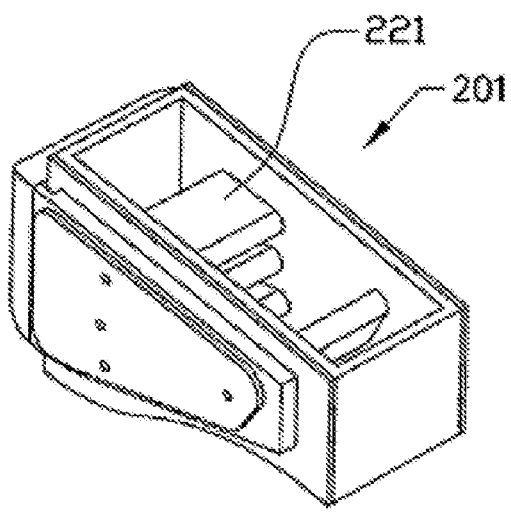

The rigid member 111 comprises a curved portion 115 with a complementary shape to the curvature of the composite body front wall 106. The curved portion 115 is fitted against the curved front wall 106 for distributing thrust forces to the composite body. An intermediate curved sheet 116, or layer, see FIG. 5, is arranged between the curved portion 115 of the rigid member 111 and the front wall 106 in order to distribute the loads to the curved surface. Due to the fact that the front wall 106 of the composite body 103 is convex, a large area is achieved for taking the load. This design will distribute the loads relatively uniformly over the curved surface. Thus, any local stress concentrations are avoided thanks to this design.

The rigid member 111 is formed by two wall parts 111a, 111b with a complementary shape to the outer surface of the composite body 103. Each of the two wall parts 111a, 111b comprises one of said rear flanges 113,114. Each of the two wall parts 111a, 111b further comprises a front flange 117, 118. The two wall parts 111a, 111b are clamped around the composite body 103 for a tight fit and fastened to each other via said front and rear flanges.

Each side wall 107,108 of the composite body 103 is provided with an aperture 119 in the form of a through hole. Likewise, each of the two wall parts 111a, 111b of the rigid member 111 is provided with a corresponding aperture 120. The apertures 120 of the rigid member wall part 111a overlaps the apertures 119 of the composite body side wall forming a crosswise means through the body 103 for receiving an elongated fastening element 121 in the form of a bolt, or pin.

The apertures 119 in the side wall 107 of the composite body 103 are larger than the bolt 121 in cross section in order to prevent the bolt from taking any axial loads. Thus, the bolt 121 is free to move relative to the side wall 107 in the longitudinal direction of the bolt. The bolt 121 is connected to each of the wall parts 111a, 111b. The pulling forces should be transferred by the composite body 103 and not by the bolt 121. The bolt 121 is therefore non-rigidly connected to the wall parts 111a, 111b. Said apertures 119,120 and the bolt 121 have an elongated, oval, or flat, shape in cross section. In this way, a large area for taking loads is achieved.

The composite structure may be produced in different ways. According to one, example, resin transfer moulding is used. The fibers 105 are first arranged in a desired continuous annular structure, for example in several layers. A mould is arranged around the elongated fiber structure at the desired position for the composite body 103. The composite matrix material is thereafter injected into the mould, filling up the space in the mould and the space between the fibers.

One embodiment of the first mounting means 201 for taking lateral and vertical loads is illustrated in FIG. 10-13. The first mounting means 201 is designed in a similar way as the thrust mounting means 101,102 described above. Only the differencies in design in the first mounting means will be described below.

The side walls 207,208 of the composite wall structure 203 comprises several through holes 219 of the above mentioned type for receiving elongated fastening means of the above mentioned type. The bolts 221 will transfer loads from the larger flat surface of the bolts to the composite wall structure 203 and in addition press the two wall parts 207,208 against the composite wall structure and thereby creating friction forces between the walls of the composite body 203 and the rigid member 211. As an alternative, the abutting surfaces of the wall parts are bonded to each other and the bolt connection then creates compression to the bonded joint.

The wall structure 203 comprises a flat rear wall 206. A rigid member 211 is fitted tightly around the composite body 203. The rigid member 211 forms a U-shape in cross section and only extends around the rear wall 206 and the two side walls 207,208. Thus, the front wall 209 of the wall structure 203 is exposed. The wall structure 203 comprises a connection element 212, in the form of a female portion, at a rear position of the mounting means 201, for connection to the aircraft. More specifically, the female portion comprises an aperture facing rearwards from the composite body 203. The aperture 212 is designed for receiving a complementary shaped male portion, preferably in the form of a ball.

The bodies 103,203 of the first, second and third mounting means 101,102,201 are arranged at mutual distances in the circumferential direction of the component 15. Thus, the composite bodies 103,203 of the first, second and third mounting means form separate units on the fiber structure 105 in the circumferential direction.

The composite body 103,203 is preferably formed in a curable polymer composite matrix material, especially a thermo set material and suitably an epoxy matrix.

Said fibers 105 are preferably formed by a carbon material.

The invention is not in any way limited to the above described embodiments, instead a number of alternatives and modifications are possible without departing from the scope of the following claims.

The design of the mounting means may be different from the design shown in the drawings. For example, the arrangement of the fibres may differ. For example, several layers of a plurality of fibres may be arranged in the circumferential direction of the component. Glass fibres may be used as one alternative to carbon fibres.

As an option, adhesive bonding can be used between the metal rigid member side walls and the side walls of the composite body.

Further, the static component 15 may be provided with a second mounting means for carrying lateral and vertical loads. By arranging two mounting means for carrying lateral and vertical loads and two mounting means for carrying thrust loads, the respective load carrying function will still be there if one mounting means should brake or fail.

The static gas turbine component may of course be applied also at other positions in the engine, for example in the turbine section, between the high pressure turbine and the low pressure turbine.

The invention claimed is:

1. An annular torsional rigid static component for an aircraft engine, the component comprising a rigid annular support member and at least one means for mounting the engine to an aircraft, wherein the mounting means comprises a connection element for connection to the aircraft, wherein the mounting means comprises a composite body formed in a composite material and the composite body is rigidly secured to the annular support member, wherein the rigid support member comprises an outer ring and an inner ring, the mounting means is arranged between the inner and outer ring and the composite body is rigidly connected to both rings thereby forming a torsional rigid unit.

2. A component according to claim 1, wherein the composite body forms a wall structure.

3. A component according to claim 2, wherein the wall structure comprises a front wall facing in an axial direction of the annular component and the front wall has a curved shape.

4. A component according to claim 3, wherein the rigid member comprises a curved portion with a complementary shape to a curvature of the front wall, and that the curved portion is fitted against the front wall for distributing thrust forces to the composite body.

5. A component according to claim 1, wherein the mounting means comprises a rigid member fitted around the composite body and that the rigid member comprises the connection element for connection to the aircraft.

6. A component according to claim 5, wherein the rigid member comprises two mutually movable parts, which are clamped around the composite body.

7. A component according to claim 5, wherein the rigid member is of metal material.

8. A component according to claim 1, wherein the composite body is formed in a polymer composite material.

9. A component according to claim 1, wherein the composite body material comprises a thermo set matrix material.

10. A component according to claim 1, wherein the composite body material comprises an epoxy matrix.

11. A component according to claim 1, wherein the composite body material at least partially comprises a plurality of high strength fibers.

12. A component according to claim 11, wherein the plurality of high strength fibers forms an extended structure in a circumferential direction of the annular component and the fiber structure extends over a longer distance in the circumferential direction of the annular component than the composite body material does.

13. A component according to claim 11, wherein the plurality of high strength fibers forms a continuous annular structure in a circumferential direction of the annular component.

14. A component according to claim 11, wherein the plurality of high strength fibers is at least partly embedded in a matrix material.

15. A component according to claim 11, wherein the fibers are formed by a carbon material.

16. A component according to claim 1, wherein the rigid support member is made of metal material.

17. A component according to claim 1, wherein the component comprises at least two circumferentially spaced mounting means.

18. A component according to claim 1, wherein the component comprises three circumferentially spaced mounting means, a first of the mounting means is arranged at an uppermost position for connection to the aircraft and a second and third of the mounting means are arranged on opposite sides of the first mounting means in the circumferential direction of the annular component.

* * * * *